Dec. 1, 1931.      H. MILLER      1,834,069

WELDING ELECTRODE

Filed Aug. 2, 1929

INVENTOR.

Henry Miller

BY

ATTORNEY.

Patented Dec. 1, 1931                                                              1,834,069

UNITED STATES PATENT OFFICE

HENRY MILLER, OF MILWAUKEE, WISCONSIN, ASSIGNOR TO A. O. SMITH CORPORATION, OF MILWAUKEE, WISCONSIN, A CORPORATION OF NEW YORK

WELDING ELECTRODE

Application filed August 2, 1929. Serial No. 383,059.

This invention relates to a welding electrode for electric arc welding.

The object of the invention is to increase the speed of welding by reducing the width of the welding groove and, consequently, the amount of deposited metal necessary to effect the weld while at the same time employing an electrode having any desired cross sectional area.

Heretofore it has been customary in arc welding to employ a round weldrod and to provide a groove of sufficient width to permit the electrode to be inserted within the groove without having the peripheral walls thereof contacting with the side walls of the welding groove and to provide sufficient clearance between the side walls and the periphery of the weldrod to prevent arcing between the same.

In such practice, the diameter of the weldrod is, within certain limitations, a function of the width of the groove and for welding articles wherein a narrow groove is employed, it is necessary to reduce the diameter of the weldrod and correspondingly the amount of current passing therethrough, thus materially reducing the speed of welding.

The present invention contemplates the employment of a weldrod of any desired cross section regardless of the depth and width of the welding groove and thus makes possible the employment of large size weldrods with corresponding greater current energies for welding articles wherein a narrow groove may be employed.

The invention contemplates the provision of a weldrod of oblong cross section, the relative dimensions of the major and minor axes being dependent upon the width of the groove and the thickness of the material being welded.

The invention is best illustrated by referring to the accompanying drawings in which.

Figure 1:
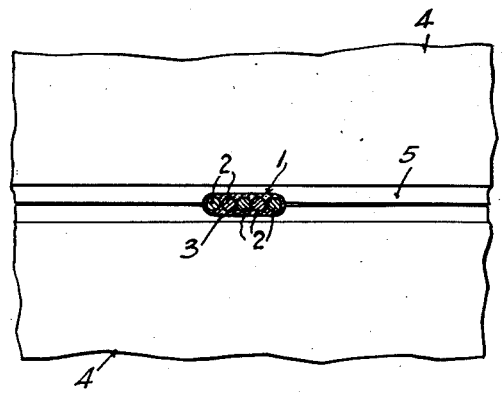
Figure 1 illustrates diagrammatically a manner of carrying out the present invention.
Figure 2:
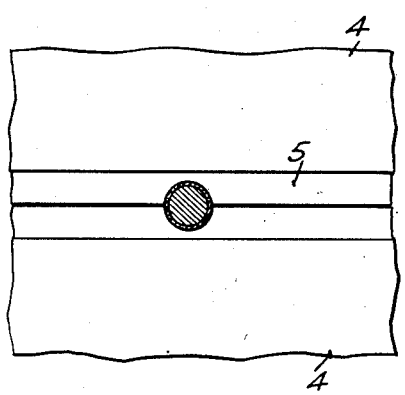
Fig. 2 illustrates the proportionate width of the groove necessary to effect a weld wherein a circular weldrod having the same cross sectional area is employed.

Referring now to the drawings, the numeral 1 indicates a weldrod having an oblong cross section, the relative dimensions of the major and minor axes being dependent upon the thickness of the material being welded and the width of the welding groove necessary to effect the desired coalescence between the parts as before mentioned.

Figure 3:
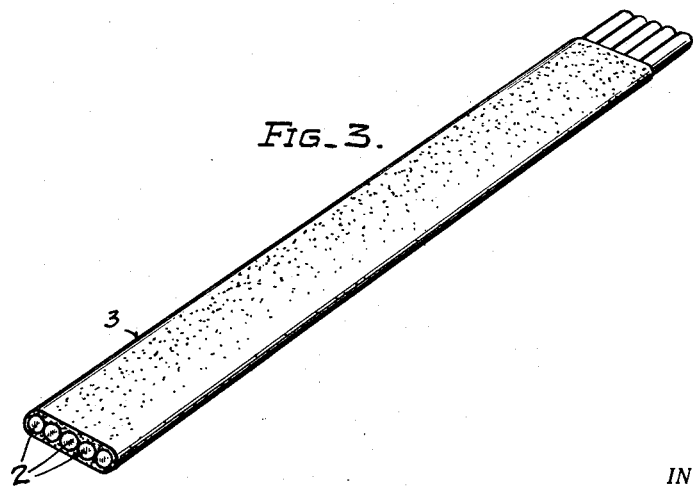
Fig. 3 illustrates the preferred form of weldrod employed in carrying out the present invention.

The weldrod may be constructed in any desired manner, such as illustrated in Fig. 3. Fig. 3 illustrates a plurality of small circular wires 2 arranged side by side in the same plane for forming a rod having an oblong cross section. The weldrod thus formed is preferably coated with a suitable composition 3 to provide a reducing atmosphere around the arc and to impart the desired characteristics thereto as may be desirable.

The article 4 to be welded is provided with a longitudinal groove 5 which is adapted to be filled with deposited metal to effect a weld thereof.

In carrying out the welding process, an electric arc is established between the weldrod formed in the manner above mentioned and the welding groove 5, the weldrod being fed toward the arc in proportion to the consumption of the weldrod.

The major axis of the weldrod is maintained parallel to the direction of the weld and the walls of the welding groove during the welding operation, and the weldrod and the article to be welded are moved relative to each other to effect a progressive weld.

From the above description it will be clear that a weldrod having any desired cross sectional area may be employed regardless of the width of the welding groove.

Various modifications and embodiments of the invention may be employed without departing from the spirit of the invention.

What is desired to be protected by Letters Patent is:

1. In an electrode for arc welding, a plurality of metallic wires arranged side by side in the same plane and in substantial contact with each other to form an oblong metallic core, and a covering enclosing and binding all of said wires in said position.

2. An electrode for arc welding, comprising a plurality of metallic rods arranged side by side in a common plane and bound together by a covering material enclosing the same, said rods being in electrical contact with each other.

In testimony whereof I have hereunto signed my name at Milwaukee, Wisconsin, this 30th day of July, 1929.

HENRY MILLER.